US012650304B2

(12) United States Patent
Pan et al.

(10) Patent No.: US 12,650,304 B2
(45) Date of Patent: *Jun. 9, 2026

(54) SYSTEMS AND METHODS FOR GENERATING A PHASE-RESOLVED OCEAN WAVE FORECASTS WITH ENSEMBLE BASED DATA ASSIMILATION

(71) Applicant: THE REGENTS OF THE UNIVERSITY OF MICHIGAN, Ann Arbor, MI (US)

(72) Inventors: Yulin Pan, Ann Arbor, MI (US); Guangyao Wang, Tianjin (CN); Yuminghao Xiao, Wuhan (CN)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/989,922

(22) Filed: Nov. 18, 2022

(65) Prior Publication Data

US 2023/0152092 A1 May 18, 2023

Related U.S. Application Data

(60) Provisional application No. 63/264,289, filed on Nov. 18, 2021.

(51) Int. Cl.
*G01C 13/00* (2006.01)
*B63B 43/02* (2006.01)
(Continued)

(52) U.S. Cl.
CPC ............ *G01C 13/004* (2013.01); *B63B 43/02* (2013.01); *B63B 51/00* (2013.01); *G01C 21/203* (2013.01)

(58) Field of Classification Search
CPC ....... G01C 13/004; G01C 21/203; G01S 7/04; G01S 13/9052; B63B 79/15; B63B 39/14; B63B 51/00; B63B 43/02
See application file for complete search history.

(56) References Cited

U.S. PATENT DOCUMENTS

| | | | | | |
|---|---|---|---|---|---|
| 5,528,493 A | * | 6/1996 | Potter | ................. | G01C 13/004 702/3 |
| 5,546,084 A | * | 8/1996 | Hindman | ............... | G01S 7/411 342/162 |

(Continued)

FOREIGN PATENT DOCUMENTS

| | | |
|---|---|---|
| CN | 105389468 B | 5/2017 |
| WO | WO-2012/117195 A1 | 9/2012 |

(Continued)

OTHER PUBLICATIONS

Xiao et al., "Time-Optimal Path Planning in an Evolving Ocean Wave Field based on Reachability Theory," IEEE Transactions and Control Systems Technology, vol. 31 (2023).
(Continued)

*Primary Examiner* — Helen C Kwok
(74) *Attorney, Agent, or Firm* — MARSHALL, GERSTEIN & BORUN LLP

(57) ABSTRACT

Systems and methods for generating a phase-resolved ocean wave forecast with ensemble based data assimilation are disclosed. An example method includes receiving radar data corresponding to an ocean surface, and determining a surface elevation and a surface potential of a portion of the ocean surface. The example method also includes generating an ensemble of perturbed ocean surface data, and applying a phase-resolved nonlinear wave model to the ensemble of perturbed ocean surface data to generate a set of forecast ocean surface data. The example method also includes receiving a subsequent set of radar data corresponding to the
(Continued)

ocean surface, and determining a subsequent surface elevation and surface potential of the portion of the ocean surface. The example method also includes combining, by applying an ensemble Kalman filter, the set of forecast ocean surface data with the subsequent surface elevation and surface potential to generate a phase-resolved ocean wave forecast.

20 Claims, 8 Drawing Sheets

(51) Int. Cl.
B63B 51/00 (2006.01)
G01C 21/20 (2006.01)

(56) References Cited

U.S. PATENT DOCUMENTS

| | | | | |
|---|---|---|---|---|
| 9,223,058 | B1 * | 12/2015 | Uy | G01V 99/00 |
| 10,677,891 | B2 | 6/2020 | Rudzinsky et al. | |
| 2009/0303109 | A1 * | 12/2009 | Erkocevic-Pribic | G01S 7/414 |
| | | | | 342/159 |
| 2012/0130569 | A1 * | 5/2012 | Huntsberger | G01C 13/002 |
| | | | | 348/47 |
| 2017/0307748 | A1 * | 10/2017 | Johnson | G01S 13/956 |
| 2018/0081028 | A1 * | 3/2018 | Kusters, Jr. | G01S 13/937 |
| 2018/0081054 | A1 * | 3/2018 | Rudzinsky | G01S 13/605 |
| 2019/0161152 | A1 * | 5/2019 | Kusters, Jr. | G01S 13/88 |
| 2022/0155069 | A1 * | 5/2022 | Previsic | B63B 79/40 |
| 2024/0300626 | A1 * | 9/2024 | Pan | B63B 51/00 |

FOREIGN PATENT DOCUMENTS

| | | | | |
|---|---|---|---|---|
| WO | WO-2020/131187 A2 | 6/2020 | | |
| WO | WO-2020180818 A1 * | 9/2020 | | B63B 79/15 |

OTHER PUBLICATIONS

Wang et al., "Phase-resolved ocean wave forecast with ensemble-based data assimilation," Journal of Fluid Mechanics, (2021).

Waseda et al., "Directional Coherent Wave Group From an Assimilated Non-Linear Wavefield," Front. Phys., vol. 9 (2021).

Yoon et al., "An Explicit Data Assimilation Scheme for a Nonlinear Wave Prediction Model Based on a Pseudo-Spectral Method," IEEE Journal of Oceanic Engineering, (2016).

Fujimoto et al., "Ensemble-Based Variational Method for Nonlinear Inversion of Surface Gravity Waves," Journal of Atmospheric and Oceanic Technology, vol. 37 (2020).

Serpoushan et al., "An Ensemble Kalman Filter Data Assimilation Scheme for Modeling the Wave Climate in Persian Gulf," Proceedings of the ASME 2013 32nd International Conference on Ocean, Offshore and Arctic Engineering (OMAE) (2013).

Zamani et al., Non-Linear Wave Data Assimilation with an ANN-Type Wind-Wave Model and Ensemble Kalman Filter (EnKF), Applied Mathematical Modeling, vol. 34 (2010).

Desmars et al., "Experimental and Numerical Assessment of Deterministic Nonlinear Ocean Waves Prediction Algorithms Using Non-Uniformly Sampled Wave Gauges," Ocean Engineering, (2020).

Simpson et al., "Wave-by-Wave Forecasting via Assimilation of Marine Radar Data," Journal of Atmospheric and Oceanic Technology, vol. 37 (2020).

Kollisch et al., Nonlinear real time prediction of ocean surface waves, Ocean Engineering, vol. 157 pp. 387-400 (2018).

* cited by examiner

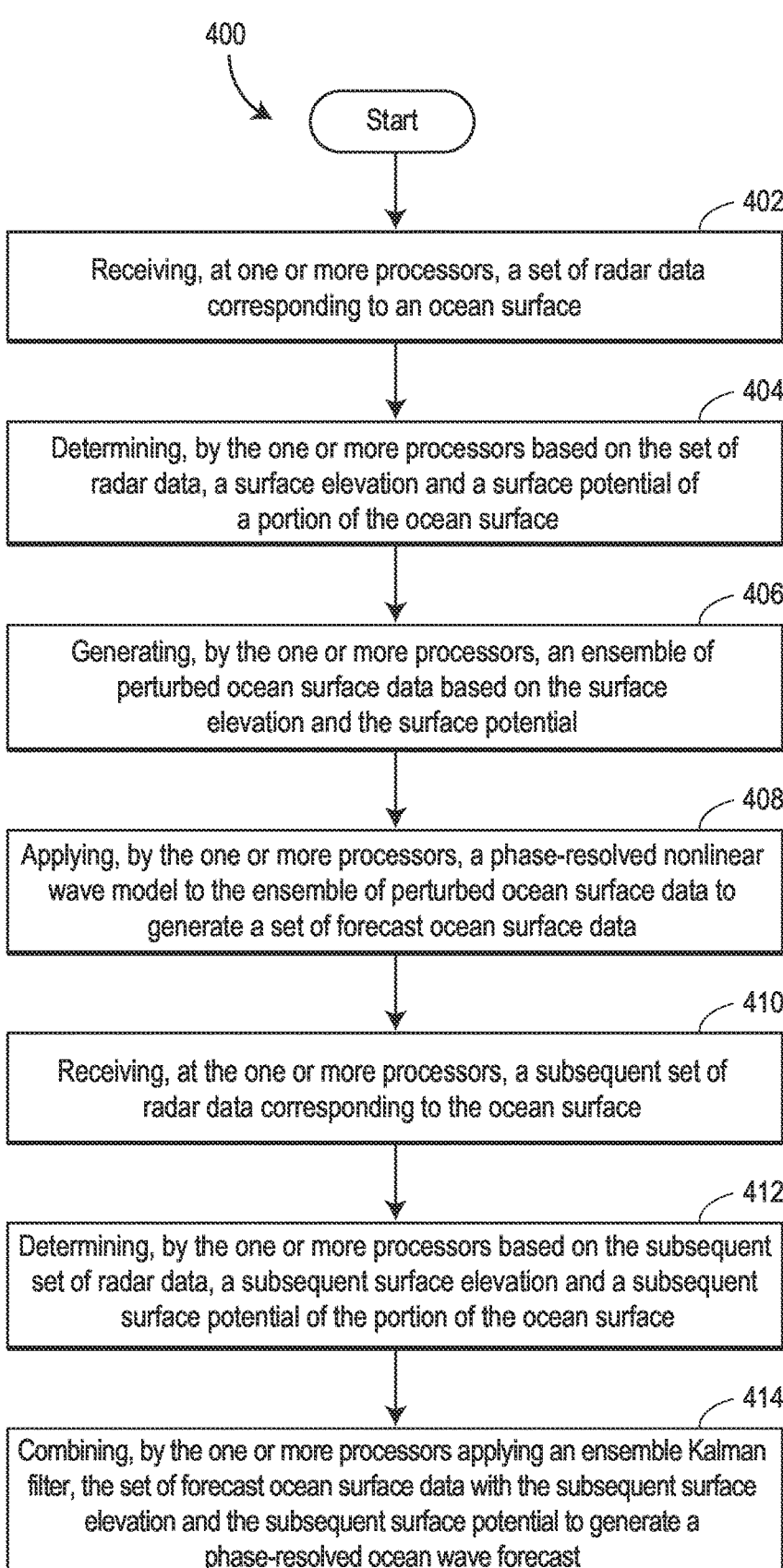

400

Start

402

Receiving, at one or more processors, a set of radar data corresponding to an ocean surface

404

Determining, by the one or more processors based on the set of radar data, a surface elevation and a surface potential of a portion of the ocean surface

406

Generating, by the one or more processors, an ensemble of perturbed ocean surface data based on the surface elevation and the surface potential

408

Applying, by the one or more processors, a phase-resolved nonlinear wave model to the ensemble of perturbed ocean surface data to generate a set of forecast ocean surface data

410

Receiving, at the one or more processors, a subsequent set of radar data corresponding to the ocean surface

412

Determining, by the one or more processors based on the subsequent set of radar data, a subsequent surface elevation and a subsequent surface potential of the portion of the ocean surface

414

Combining, by the one or more processors applying an ensemble Kalman filter, the set of forecast ocean surface data with the subsequent surface elevation and the subsequent surface potential to generate a phase-resolved ocean wave forecast

FIG. 4

WARNING: Based on analysis of surrounding surface conditions, you may intercept a rogue wave. A modified route is provided above to avoid this hazard.

SYSTEMS AND METHODS FOR GENERATING A PHASE-RESOLVED OCEAN WAVE FORECASTS WITH ENSEMBLE BASED DATA ASSIMILATION

CROSS-REFERENCE TO RELATED APPLICATIONS

This application claims the benefit of U.S. Provisional Application No. 63/264,289, filed Nov. 18, 2021, and entitled "SYSTEMS AND METHODS FOR GENERATING PHASE-RESOLVED OCEAN WAVE FORECASTS WITH ENSEMBLE BASED DATA ASSIMILATION", which is incorporated herein by reference in its entirety.

FIELD OF THE DISCLOSURE

The present disclosure relates generally to techniques for modeling ocean surfaces and, more particularly, to systems and methods for generating phase-resolved ocean wave forecasts with ensemble based data assimilation.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Accurate prediction of ocean waves plays a significant role in the industries of shipping, oil & gas, aquaculture, ocean renewable energy, and coastal and offshore construction, in that the predictions inform decisions such as route planning, emergency procedures, and the like. In the past few decades, phase-averaged and phase-resolved wave models have been developed as a way to effectively predict such ocean waves. In particular, conventional phase-averaged wave models, which provide statistical descriptions in terms of the wave spectrum, have been widely adopted for the operational forecast of global and regional sea states. However, despite their widespread application, conventional phase-averaged models have limitations of providing no information on individual deterministic waves. For example, rogue waves, which often appear sporadically and potentially cause enormous damages to offshore structures and ships, cannot be predicted.

The problem is particularly acute because conventional phase-resolved models also struggle to provide accurate information on individual waves, partly due to the difficulty in obtaining the phase-resolved ocean surface as initial conditions. Regardless, in the unlikely event that these initial conditions are obtained, conventional linear or nonlinear phase-resolved wave models still struggle to efficiently predict individual waves over a sufficiently long prediction horizon. Conventional linear models are computationally efficient, but suffer from a severely limited prediction horizon, rendering them less than ideal as a practical solution for predicting individual waves. Conventional nonlinear models generally suffer from high computational costs as a result of requiring numerical integration of the Euler equations governing the evolution of the ocean free surface, but are otherwise more accurate than conventional linear models and have a relatively long prediction horizon if an accurate initial condition for the prediction can be provided. As a result, conventional phase-resolved models are ignored for individual wave prediction because both the linear and nonlinear models are impracticable.

Therefore, there is a need for techniques capable of accurately and efficiently generating a phase-resolved ocean wave forecast to enable long-term forecasting of ocean surfaces.

SUMMARY OF THE INVENTION

According to an aspect of the present disclosure, a method for generating a phase-resolved ocean wave forecast with ensemble based data assimilation includes (a) receiving, at one or more processors, a set of radar data corresponding to an ocean surface; (b) determining, by the one or more processors based on the set of radar data, a surface elevation and a surface potential of a portion of the ocean surface; (c) generating, by the one or more processors, an ensemble of perturbed ocean surface data based on the surface elevation and the surface potential; (d) applying, by the one or more processors, a phase-resolved nonlinear wave model to the ensemble of perturbed ocean surface data to generate a set of forecast ocean surface data; (e) receiving, at the one or more processors, a subsequent set of radar data corresponding to the ocean surface; (f) determining, by the one or more processors based on the subsequent set of radar data, a subsequent surface elevation and a subsequent surface potential of the portion of the ocean surface; and (g) combining, by the one or more processors applying an ensemble Kalman filter, the set of forecast ocean surface data with the subsequent surface elevation and the subsequent surface potential to generate a phase-resolved ocean wave forecast.

In a variation of this aspect, the method further comprises: identifying, by the one or more processors, a rogue wave based on the phase-resolved ocean wave forecast; and generating, by the one or more processors applying a modified route planner, a modified travel route for a ship to avoid the rogue wave.

In another variation of this aspect, the method further comprises: iteratively performing (e)-(g) for the portion of the ocean surface until the portion is not included in the subsequent set of radar data.

In yet another variation of this aspect, the set of radar data includes radar data corresponding to a plurality of points across a region of the ocean surface, the portion of the ocean surface corresponds to a respective point of the plurality of points, and wherein the method further comprises: performing (b)-(g) for each respective point of the plurality of points.

In still another variation of this aspect, the method further comprises: linearly inflating, by the one or more processors utilizing an adaptive inflation algorithm, the set of forecast ocean surface data.

In yet another variation of this aspect, the method further comprises: identifying, by the one or more processors, a first predictable zone and a first unpredictable zone within the set of radar data; identifying, by the one or more processors, a second predictable zone and a second unpredictable zone within the subsequent set of radar data; and combining, by the one or more processors applying the ensemble Kalman filter, the set of forecast ocean surface data with the subsequent surface elevation and the subsequent surface potential to generate the phase-resolved ocean wave forecast based on radar data corresponding to an overlap region between the first predictable zone and the second predictable zone.

In still another variation of this aspect, the phase-resolved nonlinear model comprises a high-order spectral (HOS) method.

In yet another variation of this aspect, the ensemble of perturbed ocean surface data includes a plurality of surface elevations and a plurality of surface potentials, and the method further comprises: generating, by the one or more processors utilizing a set of measurement error statistics, the ensemble of perturbed ocean surface data based on the surface elevation and the surface potential.

In still another variation of this aspect, the method further comprises: causing, by the one or more processors, a user device to display the phase-resolved ocean wave forecast on a user interface of the user device for viewing by a user.

According to another aspect of the present disclosure, a system for generating a phase-resolved ocean wave forecast with ensemble based data assimilation comprises a memory, and a processor interfacing with the memory. The memory stores a set of computer-readable instructions comprising at least a phase-resolved nonlinear wave model and an ensemble Kalman filter. The processor is configured to execute the set of computer-readable instructions to cause the processor to: (a) receive a set of radar data corresponding to an ocean surface; (b) determine, based on the set of radar data, a surface elevation and a surface potential of a portion of the ocean surface; (c) generate an ensemble of perturbed ocean surface data based on the surface elevation and the surface potential; (d) apply the phase-resolved nonlinear wave model to the ensemble of perturbed ocean surface data to generate a set of forecast ocean surface data; (e) receive a subsequent set of radar data corresponding to the ocean surface; (f) determine, based on the subsequent set of radar data, a subsequent surface elevation and a subsequent surface potential of the portion of the ocean surface; and (g) combine, by applying the ensemble Kalman filter, the set of forecast ocean surface data with the subsequent surface elevation and the subsequent surface potential to generate a phase-resolved ocean wave forecast.

In a variation of this aspect, the set of computer-readable instructions further cause the processor to: identify a rogue wave based on the phase-resolved ocean wave forecast; and apply a modified route planner to generate a modified travel route for a ship to avoid the rogue wave.

In another variation of this aspect, the set of computer-readable instructions further cause the processor to: iteratively perform (e)-(g) for the portion of the ocean surface until the portion is not included in the subsequent set of radar data.

In yet another variation of this aspect, the set of radar data includes radar data corresponding to a plurality of points across a region of the ocean surface, the portion of the ocean surface corresponds to a respective point of the plurality of points, and wherein the set of computer-readable instructions further cause the processor to: perform (b)-(g) for each respective point of the plurality of points.

In yet another variation of this aspect, the set of radar data is collected by a plurality of ships and a plurality of buildings.

In still another variation of this aspect, the ensemble of perturbed ocean surface data includes a plurality of surface elevations and a plurality of surface potentials, and wherein the set of computer-readable instructions further cause the processor to: generate, by utilizing a set of measurement error statistics, the ensemble of perturbed ocean surface data based on the surface elevation and the surface potential.

In yet another variation of this aspect, the system further comprises a user interface, and wherein the set of computer-readable instructions further cause the processor to: cause the user interface to display the phase-resolved ocean wave forecast for viewing by a user.

According to yet another aspect of the present disclosure, a non-transitory computer-readable storage medium has stored thereon a set of instructions, executable by at least one processor, for generating a phase-resolved ocean wave forecast with ensemble based data assimilation. The instructions comprise: (a) instructions for receiving a set of radar data corresponding to an ocean surface; (b) instructions for determining, based on the set of radar data, a surface elevation and a surface potential of a portion of the ocean surface; (c) instructions for generating an ensemble of perturbed ocean surface data based on the surface elevation and the surface potential; (d) instructions for applying a phase-resolved nonlinear wave model to the ensemble of perturbed ocean surface data to generate a set of forecast ocean surface data; (e) instructions for receiving a subsequent set of radar data corresponding to the ocean surface; (f) instructions for determining, based on the subsequent set of radar data, a subsequent surface elevation and a subsequent surface potential of the portion of the ocean surface; and (g) instructions for combining, by applying an ensemble Kalman filter, the set of forecast ocean surface data with the subsequent surface elevation and the subsequent surface potential to generate a phase-resolved ocean wave forecast.

In a variation of this aspect, the instructions further comprise: instructions for identifying a rogue wave based on the phase-resolved ocean wave forecast; and instructions for applying a modified route planner to generate a modified travel route for a ship to avoid the rogue wave.

In another variation of this aspect, the instructions further comprise: instructions for iteratively performing (e)-(g) for the portion of the ocean surface until the portion is not included in the subsequent set of radar data.

In yet another variation of this aspect, the set of radar data includes radar data corresponding to a plurality of points across a region of the ocean surface, the portion of the ocean surface corresponds to a respective point of the plurality of points, and wherein the instructions further comprise: instructions for performing (b)-(g) for each respective point of the plurality of points.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 4 illustrates an example method for generating phase-resolved ocean wave forecasts with ensemble based data assimilation, in accordance various aspects disclosed herein.

DETAILED DESCRIPTION

As previously mentioned, conventional nonlinear models generally suffer from high computational costs as a result of requiring numerical integration of the Euler equations governing the evolution of the ocean free surface. To reduce the time involved in such numerical integration, the high-order spectral (HOS) method, which provides an efficient spectral solution to a boundary value problem involved in the nonlinear wave equations of nonlinear models, may be incorporated into nonlinear models. However, due to the significant uncertainties involved in the realistic forecast (e.g., imperfect initial free surface due to measurement and reconstruction errors; inaccurate accounting for wind, current, and other effects), as well as the chaotic nature of the nonlinear evolution equations, simulations generated by nonlinear models with HOS integration tend to deviate quickly from the true wave dynamics.

The techniques of the present disclosure solve these issues associated with nonlinear models, and more particularly, nonlinear models utilizing HOS method numerical integration, by including data assimilation (DA) to link the nonlinear model to reality through consistent model state updates with measurement data. Mathematically, the principle of DA is to minimize the error of analysis (i.e., results after combining model and measurements), or in a Bayesian framework, to minimize the variance of the state posterior given the measurements. Generally speaking, two categories of DA algorithms exist—variational-based approaches and Kalman-filter-based approaches. Variational-based algorithms are not directly applicable to operational forecasting due to their requirement of future data far after the analysis state (e.g., in contrast to the realistic situation where data becomes available sequentially in time). However, the Kalman-filter-based algorithms allow data to be sequentially assimilated by updating the present state as a weighted average of prediction values and measurement data, according to error statistics.

Figure 1A:
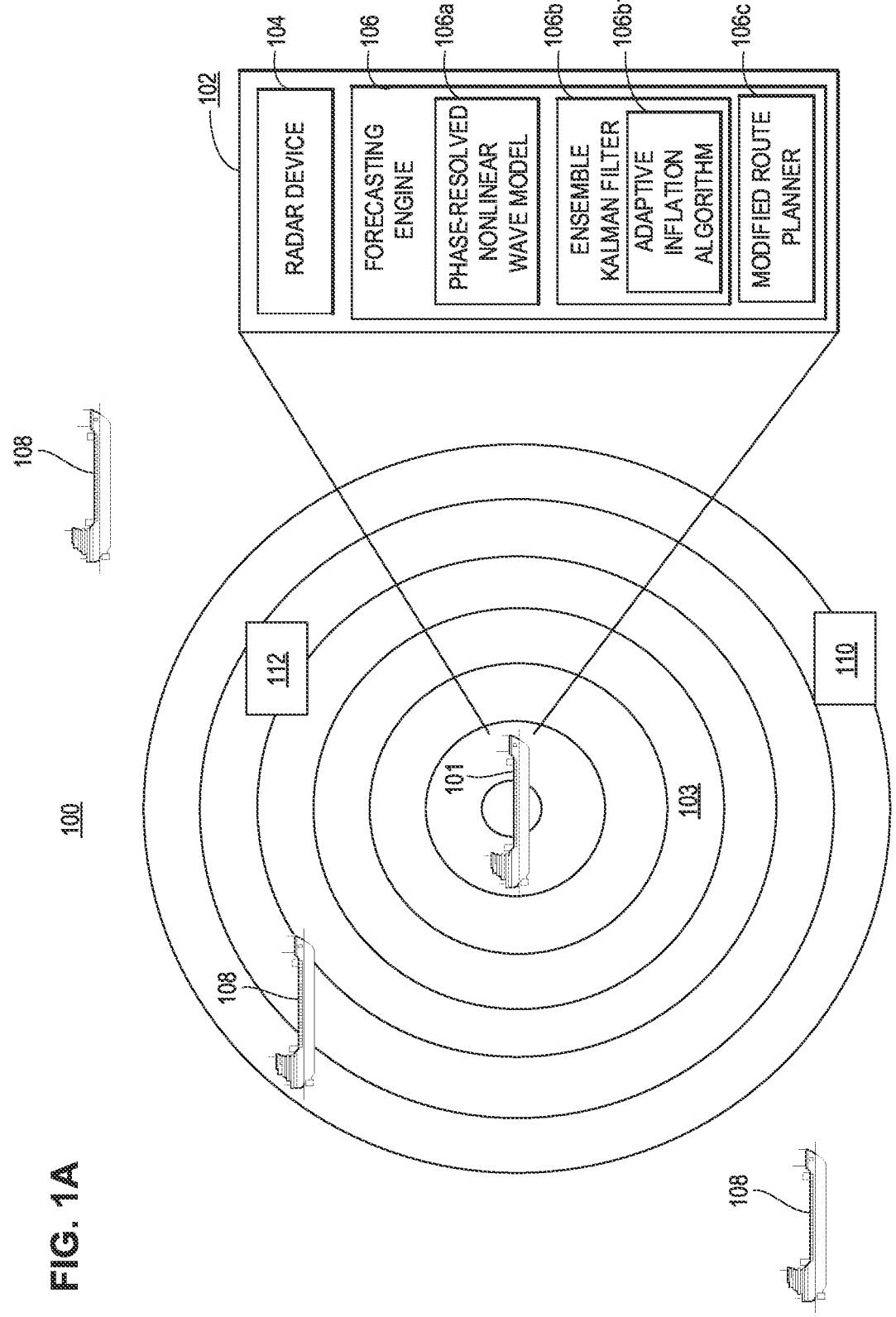
FIG. 1A illustrates an example environment and on-board radar system for generating phase-resolved ocean wave forecasts with ensemble based data assimilation, in accordance various aspects disclosed herein.
Figure 1B:
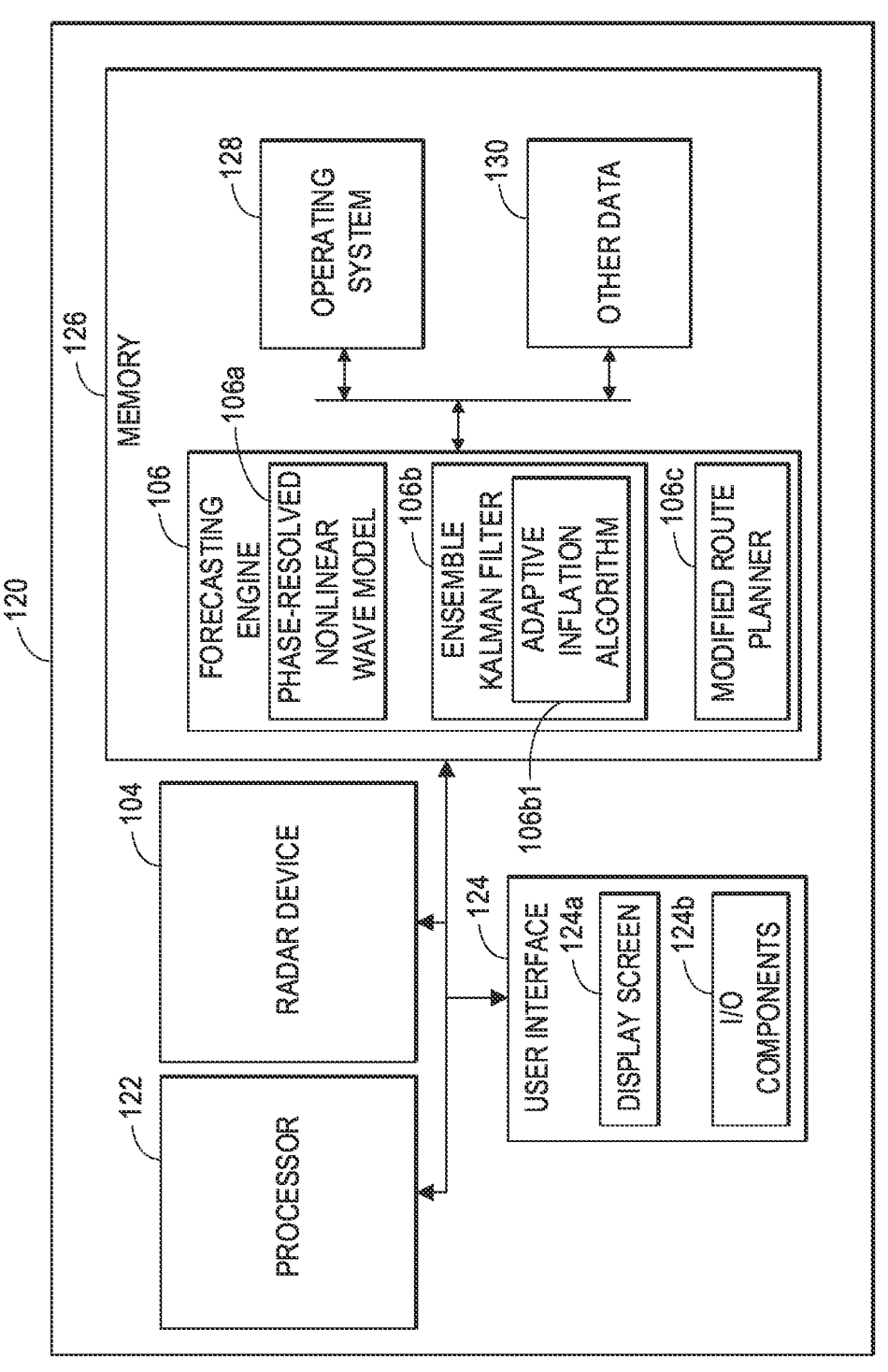
FIG. 1B illustrates an example system including components of the on-board radar system of FIG. 1A, and in accordance various aspects disclosed herein.

Thus, the present techniques provide sequential DA capabilities for nonlinear wave models by coupling an ensemble Kalman filter (EnKF) with HOS. As a result, the systems and methods of the present disclosure enable long-term forecasting of the ocean surface while ensuring minimized analysis error in a manner that was previously unachievable using conventional techniques. Moreover, the present techniques are intrinsically parallel, such that they may be implemented on processors (e.g., GPUs) in an offshore environment without sacrificing accuracy and/or efficiency in a manner that is similarly unattainable with conventional techniques. To provide a general understanding of the system(s)/components utilized in the techniques of the present disclosure, FIGS. 1A and 1B illustrate, respectively, an on-board radar system 102, and an example system 120 containing components of the on-board radar system 102 that are configured for generating phase-resolved ocean wave forecasts with ensemble based data assimilation. Accordingly, FIG. 1A provides a general overview of the on-board radar system 102 components, and FIG. 1B describes the components and their respective functions in greater detail. Moreover, it should be appreciated that the on-board radar system 102 may be incorporated as part of the example system 120, and/or the example system 120 may be the on-board radar system 102.

In any event, FIG. 1A illustrates an example environment 100 and an on-board radar system 102 for generating phase-resolved ocean wave forecasts with ensemble based data assimilation, in accordance various aspects disclosed herein. It should be appreciated that the example environment 100 an on-board radar system 102 are merely examples and that alternative or additional embodiments are envisioned.

In reference to FIG. 1A, the example environment 100 may be an ocean environment in which various vessels, structures, and/or other objects may be located. Generally, each vessel, structure, and/or other object may include a radar system in order to detect/track other objects within the vicinity and to monitor ocean surface conditions. If a vessel approaches another vessel or a structure too closely, or if the ocean surface in a particular area in which a vessel is traveling is too rough, the vessel and/or structure may detect such occurrences through the corresponding radar device. As a result, a vessel may move to avoid other vessels/structures/objects, and structures may proactively prepare for an imminent collision. Typically though, the radar data may be used primarily to detect/track unfavorable ocean surface conditions, such that ocean-going vessels and/or structures may prepare accordingly.

As illustrated in FIG. 1A, the central ship 101 may include the on-board radar system 102, and may thereby produce a scanning radar pattern 103 to view the surrounding region of the ocean surface by utilizing the radar device 104. The scanning radar pattern 103 may correspond to the maximum scannable region of the radar device 104, which in certain aspects, may extend approximately 5 kilometers (km) radially away from the central ship 101. The overall length of travel routes (also referenced herein as "paths") for ocean-going vessels may extend well beyond 5 km (e.g., 10s, 100s of km), so the prediction horizon for an average vessel is relatively limited, thereby elevating the importance of quick and accurate predictions. However, in certain aspects, the central ship 101 may receive radar data generated by additional ships (e.g., vessels 108), structures (e.g., structure 110), and/or any other suitable object or combinations thereof to extend the effective range of the scanning radar pattern 103, and by extension, the radar device 104.

In any event, and as discussed further herein, the radar device 104 may generate radar data that is sent to the forecasting engine 106, where the radar data is processed/interpreted by a phase-resolved nonlinear wave model 106a, an ensemble Kalman filter 106b, and an adaptive inflation algorithm 106b1 in order to output a phase-resolved ocean wave forecast. The phase-resolved ocean wave forecast may generally provide a user with ocean surface information, and more particularly, whether or not an obstacle exists within the scanning radar pattern 103 that may impact the travel of the central ship 101. In the event that an obstacle exists within the scanning radar pattern 103, and the forecasting engine 106 determines that the obstacle will likely impact the travel of the central ship 101, the modified route planner 106c may generate a modified travel route (also referenced herein as an "optimal path") for the central ship 101 in order to avoid the obstacle, thereby reducing the risk of damage to the ship 101 and/or optimizing the energy (e.g., fuel) consumed in order to avoid the obstacle.

For example, the radar device 104 may generate radar data that is received by the forecasting engine 106, which may determine that a rogue wave 112 is present within the scanning radar pattern 103 of the radar deice 104. The forecasting engine 106 may compare the trajectory and speed of the rogue wave 112 to the current trajectory (e.g., a planned route) and speed of the central ship 101 to determine whether or not the rogue wave 112 will likely impact the travel of the central ship 101 by intercepting the current ship 101 at some point along the current trajectory of the central ship 101. If the forecasting engine 106 determines that the rogue wave 112 will likely intercept the current ship 101 at a particular point along the current trajectory of the ship 101, then the forecasting engine 106 (by the alternative route planner 106) may generate a modified travel route for the ship 101 in order to avoid the rogue wave 112 while still reaching the destination indicated by the planned route of the ship 101.

In FIG. 1B, the example system 120 may be an integrated processing device of the central ship 101 that includes a processor 122, a user interface 124, the radar device 104, and a memory 126. The memory 126 may store the forecasting engine 106 that includes the phase-resolved nonlinear wave model 106a, the ensemble Kalman filter 106b, the adaptive inflation algorithm 106b1, and the modified route planner 106c, such that the example system 120 may include the components of the on-board radar system 102 in FIG. 1A. The memory 126 may also store an operating system 128 capable of facilitating the functionalities as discussed herein, as well as other data 130.

Generally, the processor 122 may interface with the memory 126 to access/execute the operating system 128, the other data 130, and the forecasting engine 106. The other data 130 may include a set of applications configured to facilitate the functionalities as discussed herein, and/or may include other relevant data, such as display formatting data, etc. For example, the processor 122 may access the operating system 128 in order to execute applications included as part of the other data 130, such as a vessel overview application (not shown) configured to facilitate functionalities associated with monitoring and adjusting parameters associated with a vessel (e.g., central ship 101) in which the example system 120 is incorporated, as discussed herein. As another example, the other data 130 may include operational data associated with the vessel (e.g., fuel level, engine temperature, etc.), and/or any other suitable data or combinations thereof. It should be appreciated that one or more other applications are envisioned. Moreover, it should be understood that any processor (e.g., processor 122), user interface (e.g., user interface 124), and/or memory (e.g., memory 126) referenced herein may include one or more processors, one or more user interfaces, and/or one or more memories.

The processor 122 may access the memory 126 to execute the forecasting engine 106 in order to automatically analyze radar data received from the radar device 104, and as a result, generate a phase-resolved ocean wave forecast and/or a modified travel route. Thus, for ease of discussion, it should be understood that when referenced herein as the forecasting engine 106, the phase-resolved nonlinear wave model 106a, the ensemble Kalman filter 106b, the adaptive inflation algorithm 106b1, and/or the modified route planner 106c performing an action, the processor 122 may access and execute any of the instructions comprising the forecasting engine 106, the phase-resolved nonlinear wave model 106a, the ensemble Kalman filter 106b, the adaptive inflation algorithm 106b1, and/or the modified route planner 106c to perform the action. Moreover, reference to FIGS. 2A, 2B, 3A, and 3B may be made in order to help illustrate the concepts discussed herein.

More specifically, the radar device 104 may generate radar data, and may transmit the radar data to the forecasting engine 106 which analyzes the radar data to determine a surface elevation and a surface potential of a portion of the ocean surface. As illustrated in the example data workflow 200 of FIG. 2A, the radar device 108 transmits radar data to the processor 122, which may utilize/access the forecasting engine 106 to process the radar data, as described herein. For example, the portion of the ocean surface may correspond to the scannable area (e.g., scanning radar pattern 103) of the radar device 104 where the vessel containing the radar device 104 is located. As such, the forecasting engine 106 may determine surface elevations and surface potentials for the portion of the ocean surface by analyzing subsections of the portion of the ocean surface to determine an average surface elevation and an average surface potential for each subsection. Each subsection may be of any suitable dimensions (e.g., $0.1$ km$^2$, $0.5$ km$^2$, $1$ km$^2$, etc.), and the dimensions may be determined based on the granularity of the radar data generated/transmitted by the radar device 104.

For ease of discussion, the surface elevations and surface potentials determined by the forecasting engine 106 (as well as the subsequent actions performed by the forecasting engine 106 and any components 106a, 106b, 106c) may be collectively referenced as corresponding to a single portion of the ocean surface for which the forecasting engine 106 receives radar data. However, it should be understood that the forecasting engine 106 may determine a surface elevation(s) and a surface potential(s) for each portion of the ocean surface for which the forecasting engine 106 receives radar data.

When the forecasting engine 106 determines the surface elevation and the surface potential corresponding to the portion of the ocean surface, the engine 106 may proceed to generate an ensemble of perturbed ocean surface data based on the surface elevation and the surface potential. Generally, the ensemble of perturbed ocean surface data may be represented by:

$$S_{m,j} = \left[ s_{m,j}^{(1)}, s_{m,j}^{(2)}, \ldots s_{m,j}^{(n)}, s_{m,j}^{(N-1)}, s_{m,j}^{(N)} \right] \in \mathbb{R}^{d_j \times N}, \tag{1}$$

where s represents the state variables of surface elevation $\eta$ or the surface potential $\psi$, j represents the index of time t, m indicates measurement data, and S is the corresponding ensemble. Thus, for simplicity of notation, s may be referenced hereinafter to represent the $n^{th}$ member of the perturbed ocean surface data. Further, $d_j$ may denote the number of elements in the measurement state vector of either the surface elevation or the surface potential at a particular time $t=t_j$. For example, in the schematic illustration 240 of FIG. 2B, the forecasting engine 106 may utilize the radar data received from the radar device 104 to generate an ensemble of initial ocean surface data 242.

In order to produce the ensemble members of the ensemble of perturbed ocean surface data, the forecasting engine 106 may produce the surface elevation $$\eta_{m,j}^{(n)}$$

from:

$$\eta_{m,j}^{(n)}(x) = \eta_{m,j}(x) + \omega^{(n)}(x), \tag{2}$$

where $\omega^{(n)}(x)$ may be the random noise following a zero-mean Gaussian process, and x may generally correspond to the two-dimensional spatial coordinates of the portion of the ocean surface. The random noise may have a spatial correlation function given by:

$$C\left(\omega^{(n)}(x_1), \omega^{(n)}(x_2)\right) = \begin{cases} c\exp\left(-\dfrac{|x_1 - x_2|^2}{a^2}\right) & \text{for}|x_1 - x_2| \le \sqrt{3}\,a, \\ 0 & \text{for}|x_1 - x_2| > \sqrt{3}\,a \end{cases} \tag{3}$$

where c may be the variance of $\omega^{(n)}(x)$, and a is the de-correlation length scale. In certain aspects, both c and a may depend on the characteristics of the measurement devices (e.g., radar device 104).

Thereafter, the forecasting engine 106 may utilize the principles embodied in equations (2) and (3) to reconstruct the surface potential $$\psi_{m,j}^{(n)}$$

from the surface elevation $$\eta_{m,j}^{(n)}$$

using linear wave theory. Namely, the forecasting engine 106 may approximate the surface potential $$\psi_{m,j}^{(n)}$$

by integrating over a Fourier space representation of the surface elevation $$\tilde{\eta}_{m,j}^{(n)}(k),$$

as given by:

$$\psi_{m,j}^{(n)}(x) \sim \int \frac{i\omega(k)}{|k|} \tilde{\eta}_{m,j}^{(n)}(k)e^{ik\cdot x}dk, \tag{4}$$

where $$\tilde{\eta}_{m,j}^{(n)}(k),$$

denotes a Fourier space representation of the $n^{th}$ member of the perturbed surface elevation that is included in the ensemble of perturbed ocean surface data generated by the forecasting engine 106. In equation (4), $\omega(k)$ may be the angular frequency corresponding to the vector wavenumber k, and it should be appreciated that the surface potential $$\psi_{m,j}^{(n)}$$

may only be approximated because the sign of the integrand relies on the wave traveling direction in addition to the complex conjugate relationship that must be satisfied for modes k and −k.

Additionally, the forecasting engine 106 may calculate an error covariance matrix by utilizing an operator $\mathfrak{C}$ defined as:

$$\mathfrak{C}(S) = S'(S')^T, \tag{5}$$

where $$S' = \frac{1}{\sqrt{N-1}}\left[s^{(1)} - \bar{s}, s^{(2)} - \bar{s}, \dots s^{(n)} - \bar{s} \dots s^{(N-1)} - \bar{s}, s^{(N)} - \bar{s}\right], \tag{6}$$

$$\bar{s} = \frac{1}{N}\sum_{n=1}^{N} s^{(n)}, \tag{7}$$

such that, when the operator $\mathfrak{C}$ is applied to the ensemble $S_{m,j}$, $$R_{s,j} = \mathfrak{C}(S_{m,j}) \tag{8},$$

the forecasting engine 106 may generate the error covariance matrix corresponding to the measurements obtained by the radar device 104.

Thereafter, the phase-resolved nonlinear wave model 106a may analyze the ensemble of perturbed ocean surface data to generate a forecast of ocean surface data. In particular, the phase-resolved nonlinear wave model 106a may utilize the surface elevation and surface potential corresponding to each member of the ensemble, such that for each pair of initial conditions $$s_{m,j}^{(n)},$$

the evolution of $s^{(n)}(x,t)$ may be solved by integrating the surface wave equations. For example, the surface wave equations may be given in Zakharov form:

$$\frac{\partial \eta(x, t)}{\partial t} + \frac{\partial \psi(x, t)}{\partial x} \cdot \frac{\partial \eta(x, t)}{\partial x} - \left[1 + \frac{\partial \eta(x, t)}{\partial x} \cdot \frac{\partial \eta(x, t)}{\partial x}\right]\phi_z(x, t) = 0, \tag{9}$$

$$\frac{\partial \psi(x, t)}{\partial t} + \frac{1}{2}\frac{\partial \psi(x, t)}{\partial x} \cdot \frac{\partial \psi(x, t)}{\partial x} + \tag{10}$$

$$\eta(x, t) - \frac{1}{2}\left[1 + \frac{\partial \eta(x, t)}{\partial x} \cdot \frac{\partial \eta(x, t)}{\partial x}\right]\phi_z(x, t)^2 = 0,$$

where $\phi_z(x,t) \equiv \partial\phi/\partial z|_{z=\eta}(x,t)$ may represent the surface vertical velocity, such that $\phi(x,z,t)$ may be the velocity potential of the flow field, and $\psi(x,t) = \phi(x,\eta,t)$.

With these surface wave equations (9), (10), the phase-resolved nonlinear wave model 106a may proceed to solve for the surface vertical velocity $\phi_z(x,t)$ given the surface potential $\psi(x,t)$ and the surface elevation $\eta(x,t)$ (e.g., represented by equations (2) and (4)). As an example, the phase-resolved nonlinear wave model 106a may utilize a pseudo-spectral method in combination with a mode-coupling approach, and/or any other suitable methods or combinations thereof. Regardless, in general, the phase-resolved nonlinear wave model 106a may solve equations (9) and (10) by integrating them in time for each ensemble member to generate an ensemble of forecasts (also referenced herein as a "set of forecast ocean surface data"). For example, the phase-resolved nonlinear wave model 106a may generate the ensemble of forecasts as represented by:

$$S_{f,j} = \left[ s_{f,j}^{(1)}, s_{f,j}^{(2)}, \dots s_{f,j}^{(n)}, \dots s_{f,j}^{(N-1)}, s_{f,j}^{(N)} \right] \in \mathbb{R}^{L \times N}, \tag{11}$$

where L is the number of elements in the forecast state vector, f indicates forecast data, and $$s_{f,j}^{(n)}(x) = s_f^{(n)}(x, t_j)$$

is the $n^{th}$ member of the ensemble of forecasts. For example, the phase-resolved nonlinear wave model 106a may receive the ensemble of initial ocean surface data 242, and may generate the ensemble of forecasts 244 using the equations (9) and (10). The phase-resolved nonlinear wave model 106a may also calculate an error covariance matrix corresponding to the ensemble of forecasts by applying the operator $\mathfrak{C}$ from equation (5) as follows:

$$Q_{s,j} = \mathfrak{C}(S_{f,j}) \tag{12}$$

Figure 2A:
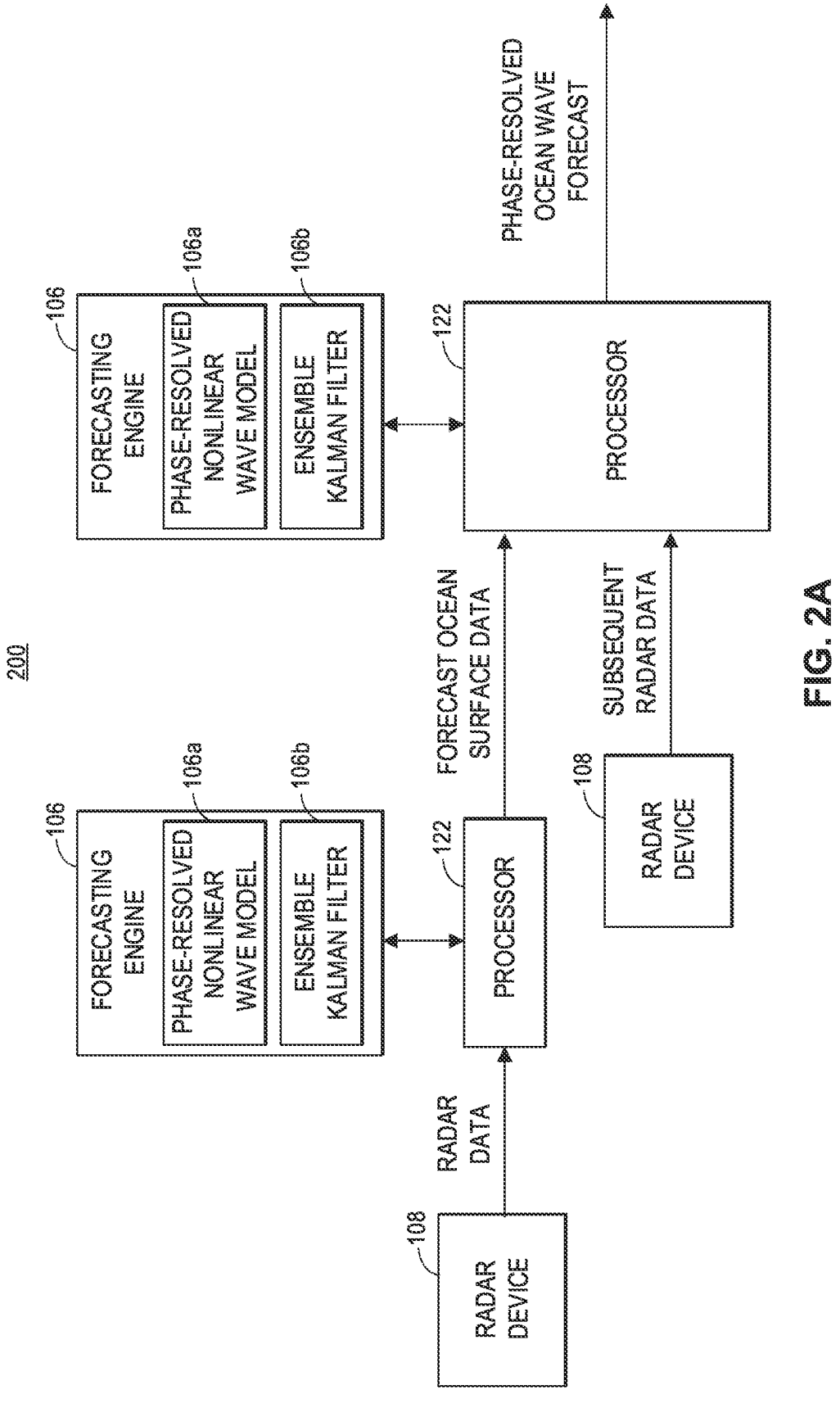
FIG. 2A illustrates an example data workflow, as utilized by the example system of FIG. 1B, and in accordance with various aspects disclosed herein.

After the phase-resolved nonlinear wave model 106a generates the set of forecast ocean surface data, the processor 122 may receive subsequent radar data. As illustrated in FIG. 2A, the processor 122 may utilize both the set of forecast ocean surface data and the subsequent radar data from the radar device 108 to generate/output the phase-resolved ocean wave forecast.

Figure 2B:
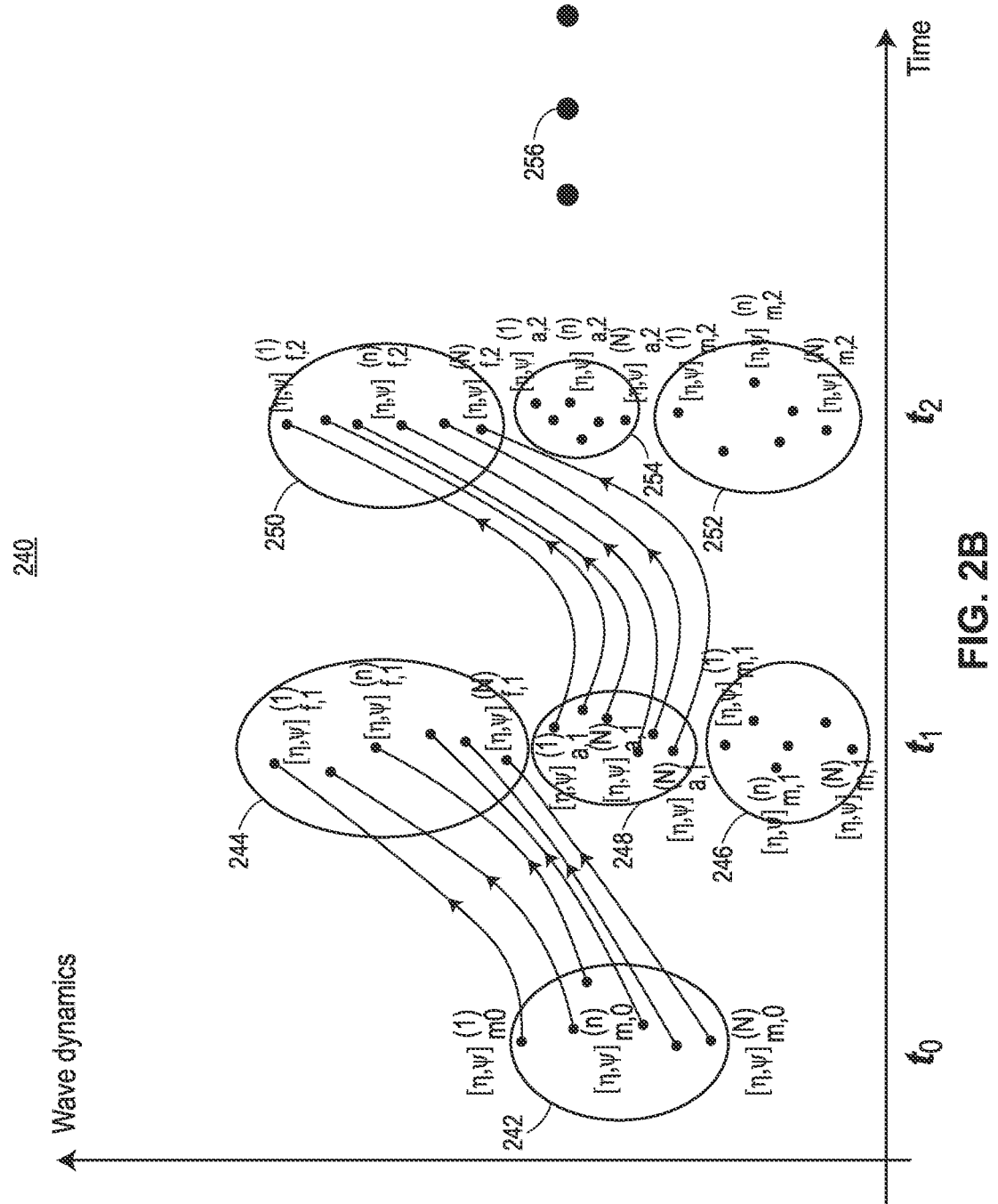
FIG. 2B is a schematic illustration of the data analysis performed in the example data workflow of FIG. 2A, and in accordance with various aspects disclosed herein.

With equations (11) and (12) the ensemble Kalman filter 106b may analyze the ensemble of forecasts to generate a phase-resolved ocean wave forecast. For example, the ensemble Kalman filter 106b may combine the forecasts with any subsequently obtained measurement data to produce analysis results represented by:

$$S_{a,j} = S_{f,j} + K_{s,j}[S_{m,j} - G_j S_{f,j}], \tag{13}$$

where $$K_{s,j} = Q_{s,j} G_j^T \left[ G_j Q_{s,j} G_j^T + R_{s,j} \right]^{-1}, \tag{14}$$

may be a Kalman gain matrix of the state, where s=η or s=ψ, and $G_j$ may be a linear operator that maps a state vector from the model space to the measurement space (e.g., $\mathbb{R}^L \rightarrow \mathbb{R}^d$). For example, the ensemble Kalman filter 106b may receive the ensemble of forecasts 244 and a set of subsequent ocean surface data 246 in order to generate the initial analysis result 248, which may be part of the phase-resolved ocean wave forecast. Moreover, as illustrated in FIG. 2B, these analysis steps may be iteratively performed (e.g., represented by 256) to continually increase the accuracy of the resulting forecast. Thus, the phase-resolved nonlinear wave model 106a may receive the analysis result 248 and generate a subsequent ensemble of forecasts 244, which the ensemble Kalman filter 106b may utilize in combination with a second set of subsequent ocean surface data 252 to generate a subsequent analysis result 254. The error associated with the subsequent analysis result 254 may be relatively smaller than the error associated with the initial analysis result 248 due to the compounding effects of continually incorporating additional measurement data (e.g., 242, 246, 252) into the forecasts. Accordingly, with each subsequent iteration, the analysis error may continue to decrease, causing the resulting forecast to become increasingly accurate over time.

When the ensemble Kalman filter 106b completes the analysis indicated in equation (13), the filter 106b may generate a phase-resolved ocean wave forecast. However, due to a finite ensemble size and underrepresented physics in the surface wave equations (9) and (10), the ensemble Kalman filter 106b may generate statistical errors leading to filter divergence and a generally sub-optimal analysis of the ocean surface. Thus, the ensemble Kalman filter 106b may additionally apply the adaptive inflation algorithm 106b1 to each member of the ensemble of forecasts to alleviate these issues prior to solving equations (13) and (14) to generate the phase-resolved ocean wave forecast. The adaptive inflation algorithm 106b1 may generally include linearly inflating each member of the ensemble of forecasts according to:

$$s_{f,j}^{(n),inf} = \sqrt{\lambda_j} \left( s_{f,j}^{(n)} - \bar{s}_{f,j} \right) + \bar{s}_{f,j}, \, n = 1, 2, \dots N, \tag{15}$$

where $\lambda_j \geq 1$ may be a covariance inflation factor, which the adaptive inflation algorithm 106b1 may determine at each $t=t_j$, and which may generally be an additional state variable that maximizes a posterior distribution $(p(\lambda_j | \eta_{m,j}))$. Thereafter, the adaptive inflation algorithm 106b1 may apply a localization scheme by performing, for example, a Schur product between $Q_{s,j}$ and a local-correlation function $\mu$, represented by:

$$Q_{s,j} = \mu \circ Q_{s,j} \tag{16},$$

where $\mu$ may be defined, for example, as a Gaspari-Cohn function, or any other suitable function or combinations thereof.

Additionally, in certain aspects, the ensemble Kalman filter 106b and/or the phase-resolved nonlinear wave model 106a may automatically adjust the determinations described above in response to the movement of the vessel. Generally, the observable region surrounding the vessel (e.g., represented by the set of radar data defining the scanning radar pattern 103) may include a sub-region that constitutes a "predictable" zone where the wave field is computationally tractable given an observation of the field in a limited space at a particular instant in time. Consequently, the observable region may also include an unpredictable zone that is not computationally tractable based on the direction of travel of the vessel which may eliminate the regions of the observable region within the unpredictable zone when receiving subsequent radar data, thereby eliminating the possibility of applying equation (13) to the prior radar data from the unpredictable zone. However, the ensemble Kalman filter 106b and/or the phase-resolved nonlinear wave model 106a may adjust the calculations involved in generating the phase-resolved ocean wave forecast based on, for example, an overlap region between the predictable zone at a first time and the predictable zone at a second time (or any suitable number of iterations).

Depending on the wave travelling direction, the boundary of the spatial predictable zone may move in time between a maximum or a minimum group speed within all wave modes. Practically speaking, for a forecast from $t_{j-1}$ to $t_j$ the predictable zone P(t) at $t=t_j$ may constitute a sub-region of the computationally tractable domain, and there may be no guarantee that the measurement region overlaps with the predictable zone. As a result, the ensemble Kalman filter 106b and/or the phase-resolved nonlinear wave model 106a may apply a modified analysis equation (e.g., relative to equation (13)), in order to adjust the resulting phase-resolved ocean wave forecast based on the interplay among the predictable zone, the unpredictable zone, and the measurement region. For example, the modified analysis equations may include:

$$S_{a,j}^P = S_{f,j}^P + K_{s,j}^P[S_{m,j}^P - G_j^P S_{f,j}^P], \tag{17}$$

$$S_{a,j}^U = H_j S_{m,j}, \tag{18}$$

where $$K_{s,j}^P = K_{s,j}(1:L^P, 1:d^P) \text{ and } G_{s,j}^P = G_{s,j}(1:d^P, 1:L^P)$$

may be sub-matrices of $K_{s,j}$ and $G_{s,j}$, respectively, associated with $x \in P_j$ in both measurement and forecast spaces. Moreover, $H_j$ may be a linear operator which maps a state vector from measurement space to an unpredictable zone in the analysis space (e.g., $\mathbb{R}^d \rightarrow \mathbb{R}^{L^U}$) based on linear/Fourier interpolation. Utilizing equations (17) and (18), the ensemble Kalman filter 106b and/or the phase-resolved nonlinear wave model 106a may achieve a minimized analysis error when analyzing the interplay among the predictable zone, the unpredictable zone, and the measurement region.

When the phase-resolved ocean wave forecast is generated, the forecasting engine 106 may analyze and/or otherwise interpret the forecast to identify a rogue wave or other obstacle in the travel path of the vessel. In this situation, the modified route planner 106c may generate a modified travel route in order for the vessel to avoid the rogue wave. Generally, the modified route planner 106c may consider a vessel (e.g., central ship 101) as a point mass moving in a two-dimensional plane subject to an evolving ocean wave field, as indicated by the phase-resolved ocean wave forecast. Moreover, the modified route planner 106c may consider that dangerous waves (e.g., rogue waves of sufficient height) may be treated as moving and deforming obstacles with known locations (e.g., for a future time). For ease of discussion, the modified route planner 106c may not constrain route planning based on the maneuverability of the vessel (such that sudden accelerations and turns are possible), other than an upper bound on the vessel speed.

Figure 3A:
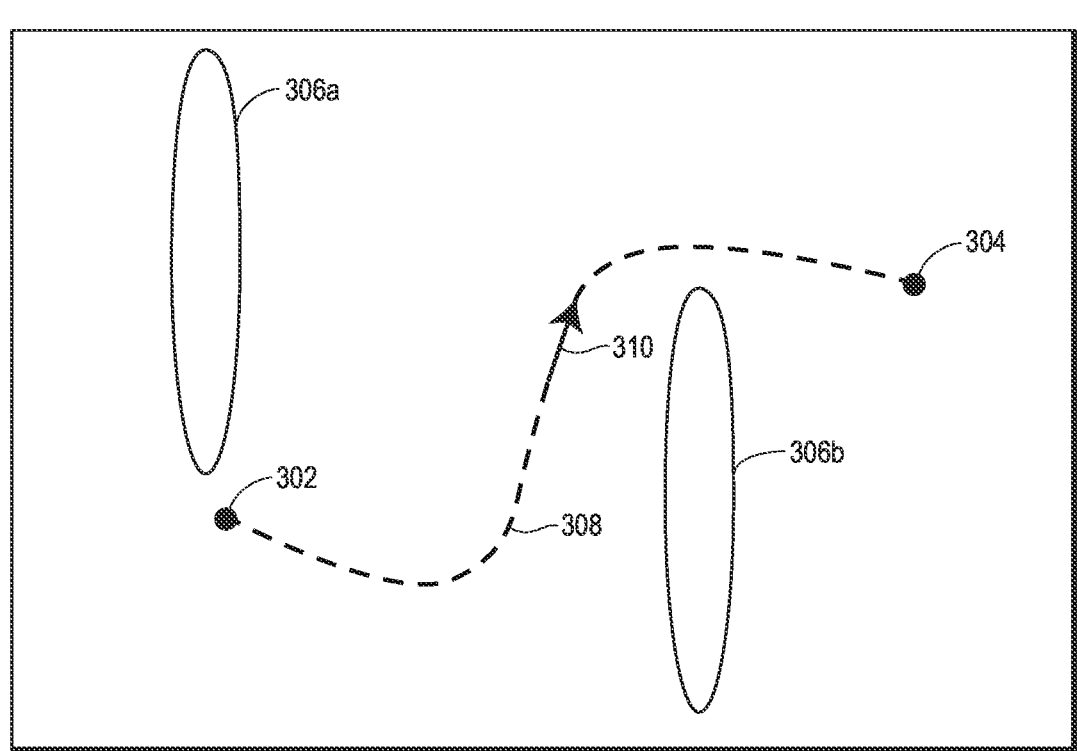
FIG. 3A illustrates an example route planning problem scenario analyzed by the example system of FIG. 1B, in accordance with various aspects disclosed herein.
Figure 3B:
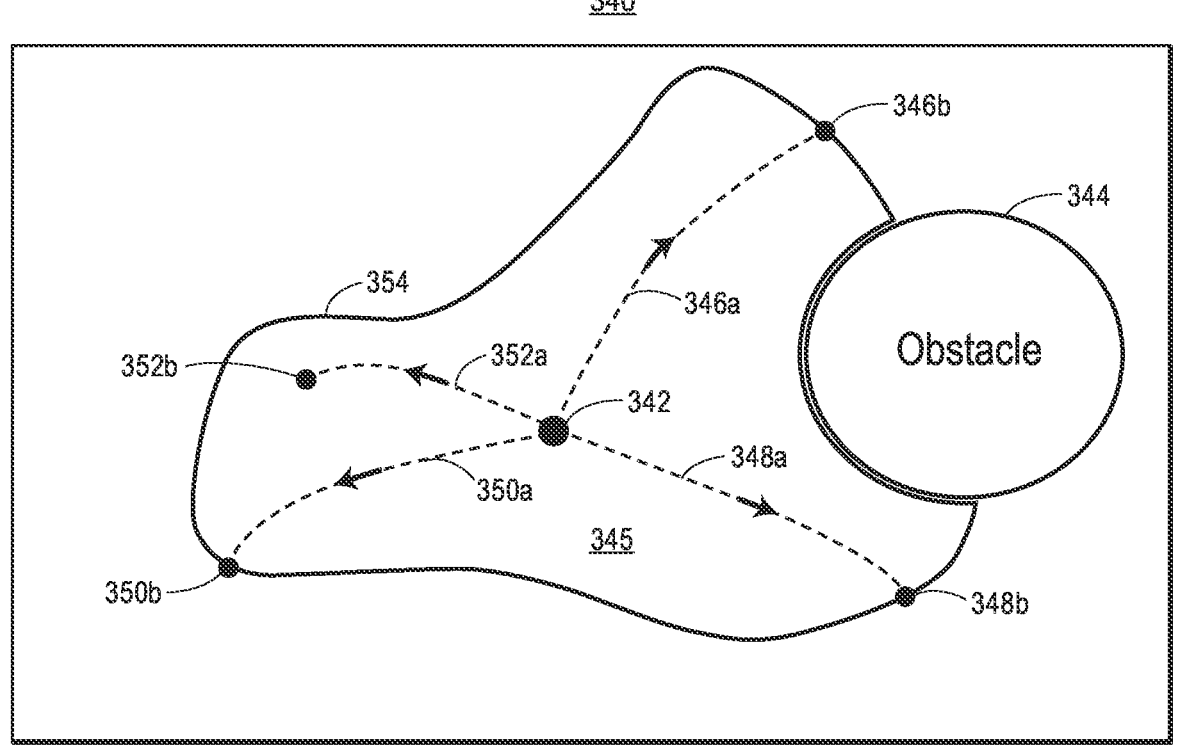
FIG. 3B illustrates an example route planning scenario performed by the example system of FIG. 1B when an obstacle is identified that may intercept a path of the vessel containing the example system of FIG. 1B, and in accordance with various aspects disclosed herein.

For example, FIG. 3A illustrates an example route planning problem scenario 300 that may be analyzed by the modified route planner 106c. The vessel may initially be located at a starting point 302, and the vessel may be traveling in order to reach the end point 304. Each of the dangerous obstacles 306a, 306b may be considered moving and deformable. As an example, the dangerous obstacles 306a, 306b may each be dangerous waves that are moving across the ocean surface with sufficient speed and/or height to damage and/or otherwise disrupt the travel of the vessel. The objective of the modified route planner 106c when presented with the example route planning problem scenario 300 may be to determine the optimal path 308 by minimizing the time taken to traverse the distance between the starting point 302 and the end point 304 at least while avoiding each of the dangerous obstacles 306a, 306b during the entire duration of the travel from the starting point 302 to the end point 304. Further, the modified route planner 106c may utilize the vessel speed and heading 310 when making this determination, wherein the trajectory and velocity of the vessel may be characterized by:

$$P(0)=x_s, P(t_f)=x_f \tag{19}$$

$$\dot{P}(\tau)=F(\tau) \cdot h(\tau) \tag{20}$$

with $$0 \leq F(\tau) \leq F_{max} \tag{21}$$

Where $x_s$ is the starting point (e.g., starting point 302), $x_f$ is the end point (e.g., end point 304), $F(\tau)$ is the velocity magnitude, $h(\tau)$ is a unit vector in the direction of travel of the vessel, equation (19) represents the trajectory of the vessel, and equation (20) represents the velocity of the vessel. As such, modified route planner 106c may find:

$$t_f^* = \min_{F(\tau), h(\tau), \tau \in [0, t_f]} \{t_f\}, \tag{22}$$

Based on the previously mentioned constraints as well as the optimal path P*($\tau$) resulting from the optimal control F*($\tau$) and h*($\tau$).

More specifically, the modified route planner 106c may utilize reachability theory in order to generate modified travel routes that avoid dangerous obstacles. The modified route planner 106c may accordingly compute a forward reachable set corresponding to the vessel at any given time, in order to begin determining a modified travel route. For example, and as illustrated in the example route planning scenario 340 of FIG. 3B, a vessel 342 that may encounter a dangerous obstacle 344 may be able to reach any of the points on the ocean surface included within the forward reachable set 345. This may be formalized as:

$$R_0[t]=\{x \in \mathbb{R}^2 | x=P(t), \forall F(\tau), h(\tau) \text{ satisfying equations (20) and (21), such that: } i) P(\tau) \in A_{obst}(\tau), ii) P(0)=x_s\} \tag{23}$$

thereby indicating that, for any position in the forward reachable set 345, there must exist admissible control inputs $F(\tau)$, $h(\tau)$ ($\tau \in [0, t]$) that provide at least one obstacle-free trajectory (e.g., trajectories 346a, 348a, 350a, 352a) that connects the starting point (e.g., represented by the vessel 342) to the position (e.g., end points 346b, 348b, 350b, 352b) within the forward reachable set 345. In fact, the forward reachable front 354 may represent the "farthest" set that ca be reached by the vessel at a particular time t.

Utilizing equation (23), the modified route planner 106c may then determine the optimal time $t_f^*$ from equation (22) as the time when $\partial R_0[t]$ first reaches the end point (e.g., end point 304). The modified route planner 106c may accordingly determine an optimal path P*(t) which remains on $\partial R_0[t]$. More specifically, the modified route planner 106c may perform two general actions in order to generate the optimal path: 1) forward propagation of $R_0[t]$ until $\partial R_0[t]$ reaches the end point at the optimal time; 2) backtracking to find intermediate waypoints on $\partial R_0[t]$ as the optimal path. Of course, it should be appreciated that the modified route planner 106c may perform any suitable number of actions in order to generate a modified travel route.

Generally, the forward propagation implemented by the modified route planner 106c may include a representation of $\partial R_0[t]$ through the level set function $\phi(x,t)$, which is then numerically incorporated by the modified route planner 106c. Namely, $\partial R_0[t]$ may be implicitly embedded into the zero level set of the level set function as:

$$\partial R_0[t]=\{x\in \mathbb{R}^2 | \phi(x,y)=0\} \tag{24}$$

where the evolution of $\phi(x,t)$ allows the modified route planner 106c to determine $\partial R_0[t]$ during $t\in[0,t_f^*]$. The modified route planner 106c may also utilize a value function $\phi(x,t)$ that can be defined for cases without obstacles as:

$$\phi(x, t) \equiv \underset{F(\tau),\, h(\tau)}{Inf} \{J(x, t, F(\tau), h(\tau))\}, \tag{25}$$

where the cost functional J is non-positive if the start point of the trajectory is the start point (e.g., starting point 302, 342) and is positive if the start point of the trajectory is not the start point. Thus, the modified route planner 106c may utilize a governing equation for $\phi(x,t)$ for cases without obstacles that may be derived, for example, using dynamic programming to arrive at the Hamilton-Jacobi-Bellman (HJB) equation:

$$\frac{\partial \phi(x, t)}{\partial t} + |\nabla \phi(x, t)| \cdot F_{max} = 0, \tag{26}$$

with initial conditions $\phi(x,0)=l(x)$, where $l(x)$ represents a Lipchitz continuous function.

For cases where obstacles are present (e.g., example route planning scenario 340), the modified route planner 106c may account for the effects of such obstacles in several ways. For example, the modified route planner 106c may include a value function $g(x,t)$ to represent the locations of obstacles by:

$$x\in A_{obst}(t) \leftrightarrow g(x,t)\geq 0 \tag{27}$$

where $g(x,t)=0$ may represent the boundaries of the obstacles. Thus, the modified route planner 106c may utilize a value function that incorporates $g(x,t)$ as:

$$\phi(x, t) \equiv \underset{F(\tau),\, h(\tau)}{Inf} \left\{ \max\left( l(P), \underset{\tau \in [0,\, t]}{\max} g(P(\tau), \tau) \right) \right\}, \tag{28}$$

where the term associated with g serves as a penalization due to obstacles. As a result, the governing equation for $\phi(x,t)$ is not the HJB equation (26), but is instead:

$$\min\left\{ \frac{\partial \phi(x, t)}{\partial t} + |\nabla \phi(x, t)| \cdot F_{max}, \phi(x, t) - g(x, t) \right\} = 0, \tag{29}$$

where $$\frac{\partial \phi(x, t)}{\partial t} + |\nabla \phi(x, t)| \cdot F_{max}$$

may be referenced herein as "term 1", $\phi(x,t)-g(x,t)$ may be referenced herein as "term 2", and with the initial condition $$\phi(x,0)=\max\{l(x),g(x,0)\} \tag{30}$$

Accordingly, when $x\in \partial R_0[t]$, the modified route planner 106c may either solve the HJB equation (26) or assign $g(x,t)$ to $\phi(x,t)$.

In order to solve equation (29) with equation (30), the modified route planner 106c may utilize a prediction-correction scheme that steps equation (29) through time. Namely, the prediction-correction scheme may include a prediction step that itself includes evolving term 1=0 from $t_n$ to $t_{n+1}$ by a numerical scheme, for example:

$$\hat{\phi}(x,t_{n+1})=F(\phi(x,t_n),g(x,t_n)) \tag{31}$$

where F is an operator that solves term 1=0 based on the specific numerical scheme applied by the modified route planner 106c. The prediction-correction scheme implemented by the modified route planner 106c may also perform a correction step that includes assigning a maximum between $\hat{\phi}(x,t_{n+1})$ and $g(x,t_{n+1})$ to $\phi(x,t_{n+1})$, represented as:

$$\phi(x,t_{n+1})=\max(\hat{\phi}(x,t_{n+1}),g(x,t_{n+1})) \tag{32}$$

Generally, the modified route planner 106c may solve equations (31) and (32) until $\phi(x_f,t)=0$, such that $\partial R_0[t]$ first reaches an end point with the value of t corresponding to $t_f^*$. For certain complicated wave fields, $\phi(x,t)$ may be distorted significantly (e.g. with a sharp gradient), and as a result, the modified route planner 106c may re-initialize $\phi(x,t)$ periodically, for example, using a partial differential equations-based method, as a signed distance function while keeping $\partial R_0[t]$ the same.

When $\partial R_0[t]$ is obtained from the forward propagation, the modified route planner 106c may perform backtracking to identify the intermediate waypoints of the optimal path. Backtracking generally involves the modified route planner 106c tracking a path from the end point backwards with $F^*(\tau)$ and $h^*(\tau)$ until the planner 106c reaches the starting point. For instances where no obstacle is present, the intermediate waypoints may be analytically obtained by the modified route planner 106c using the following:

$$\begin{cases} h^*(\tau) = \dfrac{\nabla \phi(P^*(\tau), \tau)}{|\nabla \phi(P^*(\tau), \tau)|}, \\ F^*(\tau) = F_{max} \end{cases} \tag{33}$$

and the planner 106c may extend equation (33) to instances where an obstacle with a known velocity is present. In order to backtrack in instances where deforming obstacles are present and/or multiple optimal paths exist, the modified route planner 106c may utilize a backward reachable set $B_0[-t]$, which may represent the set of initial states that can reach a target set at the end of $[-t,0]$. Generally, the modified route planner 106c may compute $B_0[-t]$ by solving equation (29) backward in time, and the planner 106c may construct the backward reachable set using $$\frac{C}{A_{obst}},$$

where C represents a circular area of radius $F_{max}\cdot\Delta t$.

More specifically, the modified route planner 106c may begin backtracking by determining one or more intersections between $\partial R_0[t_{n-1}]$ and $B_0[-\Delta t]$ as the previous waypoints for one or more paths at a particular end point. The modified route planner 106c may thereby generate an optimal path/route for each end point by determining all possible paths that reach the starting point while simultaneously satisfying the conditions specified herein. In this manner, the modified route planner 106c may generate modified travel routes for vessels based on the obstacles present within the scannable region of the vessel (e.g., 103) and/or combined scannable region of one or more additional vessels, structures, and/or other objects, that maximize the energy efficiency (e.g., fuel consumption) of vessels by minimizing total travel distance while simultaneously minimizing the risk associated with a respective vessel's travel to a destination by avoiding all obstacles (e.g., rogue waves).

In any event, the memory 126 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The example system 120 may further include a user interface 124 configured to present/receive information to/from a user. As shown in FIG. 1B, the user interface 124 may include a display screen 124a and I/O components 124b (e.g., ports, capacitive or resistive touch sensitive input panels, keys, buttons, lights, LEDs). According to some aspects, a user may access the example system 120 via the user interface 124 to review outputs from the forecasting engine 106, make various selections, and/or otherwise interact with the example system 120.

In some aspects, the example system 120 may perform the functionalities as discussed herein as part of a "cloud" network or may otherwise communicate with other hardware or software components within the cloud to send, retrieve, or otherwise analyze data. Thus, it should be appreciated that the example system 120 may be in the form of a distributed cluster of computers, servers, machines, or the like. In this implementation, a user may utilize the distributed example system 120 as part of an on-demand cloud computing platform. Accordingly, when the user interfaces with the example system 120 (e.g., by interacting with an input component of the I/O components 124b), the example system 120 may actually interface with one or more of a number of distributed computers, servers, machines, or the like, to facilitate the described functionalities.

In certain aspects, the example system 120 may communicate and interface with an external server (not shown) via a network(s). The external server may be associated with, for example, an entity that communicates radar data to various vessels/structures/objects and/or may otherwise disseminate information from the radar deice 104 and/or the forecasting engine 106, and may receive the radar data and/or outputs from the forecasting engine 106 from the example system 120. In particular, the external server may include or support a web server configured to host a website that enables users to view data received from the example system 120 for communicating to other vessels, analysis by the users, and/or for any other suitable purpose or combinations thereof. For example, the external server may enable a user to receive an indication of a rogue wave as well as a modified travel route for one or more vessels nearby the rogue wave from the example system 120 in order to enable the user to disseminate the information to connected vessels/structures/objects.

Further in these aspects, the network(s) used to connect the example system 120 to the external server may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Moreover, the external server may include a memory as well as a processor, and the memory may store an operating system capable of facilitating the functionalities as discussed herein as well as the forecasting engine 106.

Additionally, it is to be appreciated that a computer program product in accordance with an aspect may include a computer usable storage medium (e.g., standard random access memory (RAM), an optical disc, a universal serial bus (USB) drive, or the like) having computer-readable program code embodied therein, wherein the computer-readable program code may be adapted to be executed by the processor(s) 122 (e.g., working in connection with the operating system 128) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some aspects, the computer program product may be part of a cloud network of resources.

FIG. 4 illustrates an example method 400 for generating phase-resolved ocean wave forecasts with ensemble based data assimilation, in accordance various aspects disclosed herein. For ease of discussion, many of the various actions included in the method 400 may be described herein as performed by or with the use of a forecasting engine (e.g., forecasting engine 106). However, it is to be appreciated that the various actions included in the method 400 may be performed by, for example, a local processor (e.g., processor 122) executing the forecasting engine, an external server, and/or other suitable processors or combinations thereof.

The example method 400 may include receiving, at one or more processors, a set of radar data corresponding to an ocean surface (block 402). In certain aspects, the set of radar data may be collected by a plurality of ships (e.g., vessels 108) and a plurality of buildings (e.g., 110). The example method 400 may also include determining, by the one or more processors based on the set of radar data, a surface elevation and a surface potential of a portion of the ocean surface (block 404); and generating, by the one or more processors, an ensemble of perturbed ocean surface data based on the surface elevation and the surface potential (block 406).

In certain aspects, the ensemble of perturbed ocean surface data includes a plurality of surface elevations and a plurality of surface potentials. In these aspects, the example method 400 may also include generating, by the one or more processors utilizing a set of measurement error statistics, the ensemble of perturbed ocean surface data based on the surface elevation and the surface potential.

The example method 400 may also include applying, by the one or more processors, a phase-resolved nonlinear wave model (e.g., phase-resolved nonlinear wave model 106a) to the ensemble of perturbed ocean surface data to generate a set of forecast ocean surface data (block 408). In certain aspects, the phase-resolved nonlinear model comprises a high-order spectral (HOS) method. In some aspects, the example method 400 may also include linearly inflating, by the one or more processors utilizing an adaptive inflation algorithm (e.g., adaptive inflation algorithm 106b1), the set of forecast ocean surface data.

The example method 400 may also include receiving, at the one or more processors, a subsequent set of radar data corresponding to the ocean surface (block 410); and determining, by the one or more processors based on the subsequent set of radar data, a subsequent surface elevation and a subsequent surface potential of the portion of the ocean surface (block 412).

The example method 400 may also include combining, by the one or more processors applying an ensemble Kalman filter (e.g., ensemble Kalman filter 106*b*), the set of forecast ocean surface data with the subsequent surface elevation and the subsequent surface potential to generate a phase-resolved ocean wave forecast. In certain aspects, the example method 400 may also include identifying, by the one or more processors, a rogue wave based on the phase-resolved ocean wave forecast. In these aspects, the example method 400 may further include generating, by the one or more processors applying a modified route planner (e.g., modified route planner 106*c*), a modified travel route for a ship to avoid the rogue wave.

In certain aspects, the example method 400 may also include iteratively performing blocks 410-414 for the portion of the ocean surface until the portion is not included in the subsequent set of radar data. In some aspects, the set of radar data may include radar data corresponding to a plurality of points across a region of the ocean surface, the portion of the ocean surface may correspond to a respective point of the plurality of points, and the example method 400 may also include performing blocks 404-414 for each respective point of the plurality of points.

In some aspects, the example method 400 may also include identifying, by the one or more processors, a first predictable zone and a first unpredictable zone within the set of radar data; and identifying, by the one or more processors, a second predictable zone and a second unpredictable zone within the subsequent set of radar data. Further in these aspects, the example method 400 may also include combining, by the one or more processors applying the ensemble Kalman filter, the set of forecast ocean surface data with the subsequent surface elevation and the subsequent surface potential to generate the phase-resolved ocean wave forecast based on radar data corresponding to an overlap region between the first predictable zone and the second predictable zone.

Figure 5:
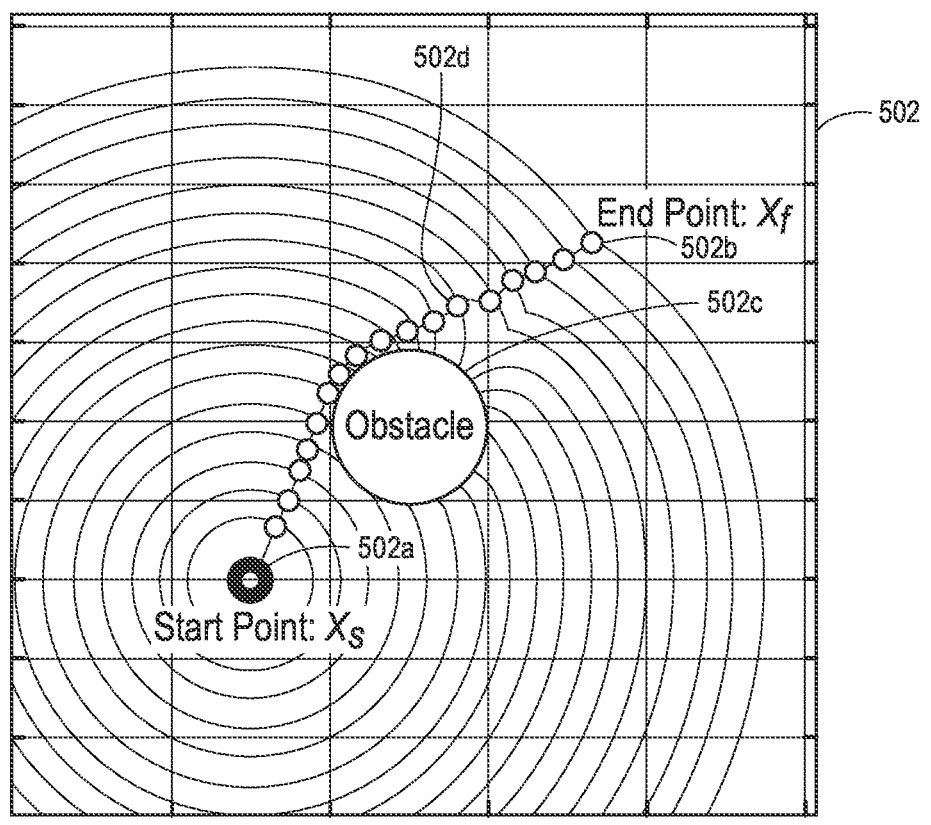
FIG. 5 depicts an example user interface display enabling a user to view a modified travel route to avoid an identified obstacle, in accordance with various aspects disclosed herein.

Moreover, in certain aspects, the example method 400 may also include causing, by the one or more processors, a user device to display the phase-resolved ocean wave forecast on a user interface of the user device for viewing by a user. For example, FIG. 5 depicts an example user interface display 500 enabling a user to view a modified travel route to avoid an identified obstacle, in accordance with various aspects disclosed herein. In particular, as illustrated in FIG. 5, the user device (e.g., on-board radar system 102, example system 120) may render a display that includes a graphical display portion 502 and a textual display portion 504.

The graphical display portion 502 may include the current location 502 of the vessel, the destination 502*b* of the vessel, the obstacle 502*c*, and the modified travel route 502*d*. The modified travel route 502*d* may be indicated as a series of waypoints along the route (as illustrated in FIG. 5) and/or may be a continuous line, or any other suitable representation of a route or combinations thereof. In certain aspects, the graphical display portion 502 may additionally include multiple modified travel routes indicating alternative travel routes that avoid the obstacle 502*c* while traveling from the current location 502*a* to the destination 502*b*. As such, each alternative travel route displayed on the graphical display portion 502 may provide a user with a selectable option between/among the alternative modified travel routes. For example, a user may desire to take a different modified route to avoid the obstacle than the modified route suggested by the system (e.g., example system 120). Thus, the user may interact with the graphical display portion 502 and/or corresponding input components (e.g., I/O components 124*b*) to select the different modified route.

Each of the objects represented on the graphical display portion 502 may be and/or otherwise include any suitable type of text, symbols, patterns, colors, and/or any other suitable visual indicia. For example, as illustrated in FIG. 5, the current location 502 is marked with text reading "Start Point: $X_S$", the destination 502*b* is marked with text reading "End Point: $X_f$", and the obstacle 502*c* is marked with text reading "Obstacle". Moreover, each object represented on the graphical display portion 502 may be or include an image, video, and/or any other suitable visual display configuration.

The textual display portion 504 may include a text-based message for a user that corresponds to the display within the graphical display portion 502. For example, as illustrated in FIG. 5, the textual display portion 504 includes text reading "Based on analysis of surrounding surface conditions, you may intercept a rogue wave. An modified route is provided above to avoid this hazard." Thus, the text-based message within the textual display portion 504 may enable a user to understand the context of the display within the graphical display portion 502, and as a result, the user may make more informed decisions to follow the modified route, thereby alleviating risk to the vessel from contact with the obstacle 502*c* and wasteful energy consumption during avoidance of the obstacle 502*c*.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment," "one aspect," "an aspect," or "an embodiment" means that a particular element, feature, structure, or characteristic described in connection with the embodiment is included in at least one embodiment/aspect. The appearances of the phrase "in one embodiment" or "in one aspect" in various places in the specification are not necessarily all referring to the same embodiment/aspect.

Some embodiments/aspects may be described using the expression "coupled" and "connected" along with their derivatives. For example, some embodiments/aspects may be described using the term "coupled" to indicate that two or more elements are in direct physical or electrical contact. The term "coupled," however, may also mean that two or more elements are not in direct contact with each other, but yet still co-operate or interact with each other. The embodiments/aspects are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments/aspects herein. This is done merely for convenience and to give a general sense of the description. This description, and the claims that follow, should be read to include one or at least one and the singular also includes the plural unless it is obvious that it is meant otherwise.

While the present invention has been described with reference to specific examples, which are intended to be illustrative only and not to be limiting of the invention, it will be apparent to those of ordinary skill in the art that changes, additions and/or deletions may be made to the disclosed embodiments/aspects without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A method for generating a phase-resolved ocean wave forecast with ensemble based data assimilation, the method comprising:

(a) receiving, at one or more processors, a set of radar data corresponding to an ocean surface;

(b) determining, by the one or more processors based on the set of radar data, a surface elevation and a particle velocity of a portion of the ocean surface;

(c) generating, by the one or more processors, an ensemble of perturbed ocean surface data based on the surface elevation and the particle velocity, wherein said ensemble is generated by adding random noise to the surface elevation;

(d) applying, by the one or more processors, a phase-resolved nonlinear wave model to the ensemble of perturbed ocean surface data to generate a set of forecast ocean surface data;

(e) receiving, at the one or more processors, a subsequent set of radar data corresponding to the ocean surface;

(f) determining, by the one or more processors based on the subsequent set of radar data, a subsequent surface elevation and a subsequent particle velocity of the portion of the ocean surface; and (g) combining, by the one or more processors applying an ensemble Kalman filter, the set of forecast ocean surface data with the subsequent surface elevation and the subsequent particle velocity to generate a phase-resolved ocean wave forecast.

2. The method of claim 1, further comprising:

identifying, by the one or more processors, a rogue wave based on the phase-resolved ocean wave forecast; and generating, by the one or more processors applying a modified route planner, a modified travel route for a ship to avoid the rogue wave.

3. The method of claim 1, wherein the method further comprises:

iteratively performing (e)-(g) for the portion of the ocean surface until the portion is not included in the subsequent set of radar data.

4. The method of claim 1, wherein the set of radar data includes radar data corresponding to a plurality of points across a region of the ocean surface, the portion of the ocean surface corresponds to a respective point of the plurality of points, and wherein the method further comprises:

performing (b)-(g) for each respective point of the plurality of points.

5. The method of claim 1, further comprising:

linearly inflating, by the one or more processors utilizing an adaptive inflation algorithm, the set of forecast ocean surface data.

6. The method of claim 1, further comprising:

identifying, by the one or more processors, a first predictable zone and a first unpredictable zone within the set of radar data;

identifying, by the one or more processors, a second predictable zone and a second unpredictable zone within the subsequent set of radar data; and combining, by the one or more processors applying the ensemble Kalman filter, the set of forecast ocean surface data with the subsequent surface elevation and the subsequent particle velocity to generate the phase-resolved ocean wave forecast based on radar data corresponding to an overlap region between the first predictable zone and the second predictable zone.

7. The method of claim 1, wherein the phase-resolved nonlinear wave model comprises a high-order spectral (HOS) method.

8. The method of claim 1, wherein the ensemble of perturbed ocean surface data includes a plurality of surface elevations and a plurality of particle velocities, and the method further comprises:

generating, by the one or more processors utilizing a set of measurement error statistics, the ensemble of perturbed ocean surface data based on the surface elevation and the particle velocity.

9. The method of claim 1, further comprising:

causing, by the one or more processors, a user device to display the phase-resolved ocean wave forecast on a user interface of the user device for viewing by a user.

10. A system for generating a phase-resolved ocean wave forecast with ensemble based data assimilation, the system comprising:

a memory storing a set of computer-readable instructions comprising at least a phase-resolved nonlinear wave model and an ensemble Kalman filter; and a processor interfacing with the memory, and configured to execute the set of computer-readable instructions to cause the processor to:

(a) receive a set of radar data corresponding to an ocean surface;

(b) determine, based on the set of radar data, a surface elevation and a particle velocity of a portion of the ocean surface;

(c) generate an ensemble of perturbed ocean surface data based on the surface elevation and the particle velocity, wherein said ensemble is generated by adding random noise to the surface elevation;

(d) apply the phase-resolved nonlinear wave model to the ensemble of perturbed ocean surface data to generate a set of forecast ocean surface data;

(e) receive a subsequent set of radar data corresponding to the ocean surface;

(f) determine, based on the subsequent set of radar data, a subsequent surface elevation and a subsequent particle velocity of the portion of the ocean surface; and (g) combine, by applying the ensemble Kalman filter, the set of forecast ocean surface data with the subsequent surface elevation and the subsequent particle velocity to generate a phase-resolved ocean wave forecast.

11. The system of claim 10, wherein the set of computer-readable instructions further cause the processor to:

identify a rogue wave based on the phase-resolved ocean wave forecast; and apply a modified route planner to generate a modified travel route for a ship to avoid the rogue wave.

12. The system of claim 10, wherein the set of computer-readable instructions further cause the processor to:

iteratively perform (e)-(g) for the portion of the ocean surface until the portion is not included in the subsequent set of radar data.

13. The system of claim 10, wherein the set of radar data includes radar data corresponding to a plurality of points across a region of the ocean surface, the portion of the ocean surface corresponds to a respective point of the plurality of points, and wherein the set of computer-readable instructions further cause the processor to:

perform (b)-(g) for each respective point of the plurality of points.

14. The system of claim 10, wherein the set of radar data is collected by a plurality of ships and a plurality of buildings.

15. The system of claim 10, wherein the ensemble of perturbed ocean surface data includes a plurality of surface elevations and a plurality of particle velocities, and wherein the set of computer-readable instructions further cause the processor to:

generate, by utilizing a set of measurement error statistics, the ensemble of perturbed ocean surface data based on the surface elevation and the particle velocity.

16. The system of claim 10, further comprising a user interface, and wherein the set of computer-readable instructions further cause the processor to:

cause the user interface to display the phase-resolved ocean wave forecast for viewing by a user.

17. A non-transitory computer-readable storage medium having stored thereon a set of instructions, executable by at least one processor, for generating a phase-resolved ocean wave forecast with ensemble based data assimilation, the instructions comprising:

(a) instructions for receiving a set of radar data corresponding to an ocean surface;

(b) instructions for determining, based on the set of radar data, a surface elevation and a particle velocity of a portion of the ocean surface;

(c) instructions for generating an ensemble of perturbed ocean surface data based on the surface elevation and the particle velocity, wherein said ensemble is generated by adding random noise to the surface elevation;

(d) instructions for applying a phase-resolved nonlinear wave model to the ensemble of perturbed ocean surface data to generate a set of forecast ocean surface data;

(e) instructions for receiving a subsequent set of radar data corresponding to the ocean surface;

(f) instructions for determining, based on the subsequent set of radar data, a subsequent surface elevation and a subsequent particle velocity of the portion of the ocean surface; and (g) instructions for combining, by applying an ensemble Kalman filter, the set of forecast ocean surface data with the subsequent surface elevation and the subsequent particle velocity to generate a phase-resolved ocean wave forecast.

18. The non-transitory computer-readable storage medium of claim 17, wherein the instructions further comprise:

instructions for identifying a rogue wave based on the phase-resolved ocean wave forecast; and instructions for applying a modified route planner to generate a modified travel route for a ship to avoid the rogue wave.

19. The non-transitory computer-readable storage medium of claim 17, wherein the instructions further comprise:

instructions for iteratively performing (e)-(g) for the portion of the ocean surface until the portion is not included in the subsequent set of radar data.

20. The non-transitory computer-readable storage medium of claim 17, wherein the set of radar data includes radar data corresponding to a plurality of points across a region of the ocean surface, the portion of the ocean surface corresponds to a respective point of the plurality of points, and wherein the instructions further comprise:

instructions for performing (b)-(g) for each respective point of the plurality of points.

* * * * *